US005517745A

United States Patent [19]

Preston et al.

[11] Patent Number: 5,517,745

[45] Date of Patent: May 21, 1996

[54] METHOD OF PRODUCING A FIBER OPTIC SIGN

[76] Inventors: Daniel Preston, 537 Greenwich St., New York, N.Y. 10014; Ward Fleming, 43 Augustine Rd., Saugartes, N.Y. 12477

[21] Appl. No.: 57,093

[22] Filed: May 4, 1993

[51] Int. Cl.$^6$ .......... G02B 5/16

[52] U.S. Cl. .......... 29/527.2; 29/DIG. 46; 29/592.1; 264/1.25; 40/547; 362/812; 156/180

[58] Field of Search .......... 29/527.2, DIG. 46, 29/411, 458, 527.3, 592.1; 264/1.3, 1.25, 1.5, 71, 261; 362/32, 812; 40/547; 156/180, 242

[56] References Cited

U.S. PATENT DOCUMENTS 2,992,956 7/1961 Bazinet, Jr. .......... 156/73
3,704,504 12/1972 Koegler .......... 29/DIG. 46
3,853,658 12/1974 Ney .......... 264/1.5 X
4,084,308 4/1978 Runge .......... 29/527.2
5,160,565 11/1992 Chazalon et al. .......... 264/1.5 X

*Primary Examiner*—Timothy V. Eley
*Assistant Examiner*—Khan V. Nguyen
*Attorney, Agent, or Firm*—Jeffrey I. Kaplan

[57] ABSTRACT

A fiber optic sign and method of making the same are disclosed. A plurality of fibers are arranged to form a design, preferably by a template, and are then bonded together into a block of glue, epoxy, rubber, or other castable liquid. Arrangement of the fibers is accomplished by placing them on a template and vibrating them until they fall through holes in the template.

9 Claims, 2 Drawing Sheets

METHOD OF PRODUCING A FIBER OPTIC SIGN

TECHNICAL FIELD

This invention relates to fiber optic signs, and more particularly, to an improved method of manufacturing such signs and the improved sign resulting from such method.

BACKGROUND OF THE INVENTION

Fiber optic signs have been known in the art for many years. A typical prior art fiber optic sign 100 is shown in FIG. 1.

In accordance with standard techniques, holes 101 are drilled through a plate 102. The holes 101 form the desired design which, in the example depicted in FIG. 1, is the letters "PGI".

After the desired design is formed by a plurality of such holes, light conducting fibers (not shown in FIG. 1) are inserted into the holes 101, with one fiber being inserted into each hole. The tip of a fiber must be individually glued into each hole. After all the fibers are glued into the holes 101, the unglued ends of the fibers are bunched together and subjected to a light source. The light source may periodically vary in color or intensity. Such a source is typically implemented by arranging a plurality of selective light filters between a white light source and the bunched up fibers, and then periodically changing the particular filter disposed between all or a portion of the bunched up fibers and the white light source as shown in FIG. 2. Conventional color wheels may be used, or an encoder can be employed to vary the color of the light source.

Selective filter 202 includes different portions which each pass light of a different color or intensity. Selective filter 202 may move, for example, by rotating. White light source 201 is filtered by selective filter 202 and different colors or intensities of light are transmitted through bunched up fibers 203 to the holes 101 outlining the design on plate 102. Thus, the design lights up, and different portions thereof change colors.

There are drawbacks to such a sign. For example, no automated mass production is possible. Each sign must have holes drilled to form the design, and each fiber must be manually inserted and glued into its associated hole 101. The process is time consuming and labor intensive, and the resulting sign quite costly. Since there is so much labor involved in inserting the fibers individually, usually only the outline of the desired design is defined by fibers, rather than the entire area of the design.

Those involved in this art have long accepted the fact that mass production of fiber optic signs is unfeasible. However, should a technique for such mass production become available, it would drastically decrease the cost of such signs and make them available for other markets.

SUMMARY OF THE INVENTION

The aforementioned and other problems of the prior art are overcome in accordance with the present invention which relates to a mass producible fiber optic sign. In accordance with the present technique, a desired design is placed on a plate with holes, the holes preferably occupying the entire area of the design. A plurality of fibers are then placed on top of the design and vibrated, causing the fibers to fall through the holes occupying the design. A surface below the design stops each fiber after is has fallen through the hole so that a small portion of each of the fibers emanates out the top of the hole into which the fiber has fallen. The small portions of the fibers emanating out of the top of the holes are then cast together in a block of epoxy or other castable compound to form the finished sign.

Since this method is not labor intensive, it is feasible to produce spectacular signs using many more fibers than would be feasible using a hand insertion method. Signs can be made wherein the fibers fill the entire area of the design, not just the outline of a painted or stenciled design.

DETAILED DESCRIPTION OF THE PREFERRED EMBODIMENT

Figure 1:
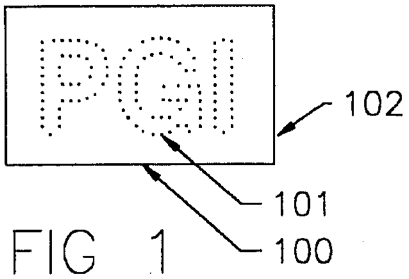
FIG. 1 shows a prior art fiber optic sign.
Figure 2:
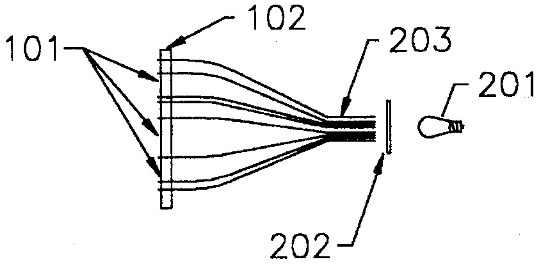
FIG. 2 shows a lighting arrangement for use with the fiber optic sign of FIG. 1.
Figure 3:
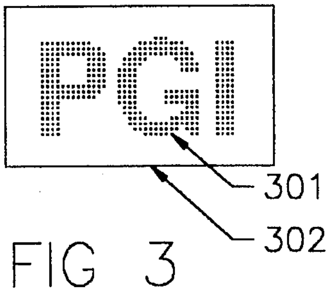
FIG. 3 depicts a top view of a portion of a system for manufacturing the novel fiber optic sign of the present invention.

FIG. 3 depicts the design "PGI" in block lettering as it would be made in accordance with the preferred embodiment of the present invention. The design may be placed on plate 302 using a variety of techniques, two of which are described below.

One possible technique is to simply drill holes in a metal sheet which correspond to the desired design. Another possible technique is to cut the design out of an adhesive backed vinyl stencil and affix it to a perforated metal screen, leaving the holes exposed only where the design has been cut out. This latter method will be used for purposes of explanation hereafter, with the understanding that either of the methods, as well as many other ones, may be used to form the design from holes.

It has been found that holes (and the fibers inserted in them) placed at a density of ten per linear inch (100/inch$^2$) provide a suitable result, although other densities may also be used. It is also feasible to vary the density of the holes in different parts of the design or along different directions thereof. For example, the edges of the lettering may have a greater hole density than the middle of the lettering, so that the edges of the finished sign appear sharp. A prototype was built using 0.063 diameter holes and 0.060 diameter fibers. A hole that is 0.003" greater than the diameter of the fiber has been found to be most advantageous in order to facilitate trouble free insertion of fibers and to prevent the castable compound from leaking through the gap between each fiber and the hole into which it is inserted.

Figure 4:
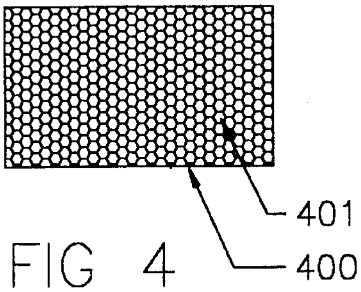
FIG. 4 is a top view of a section of hexcell.

FIG. 4 shows a top view of a section of hexcell 400. The hexcell 400 includes a plurality of openings 401. Hexcell is widely available in different cell sizes and depths. The hexcell 400 is used in the preferred embodiment as a "fiber holder". It serves to hold the fibers to be inserted substantially parallel to each other and perpendicular to screen 503.

Figure 5:
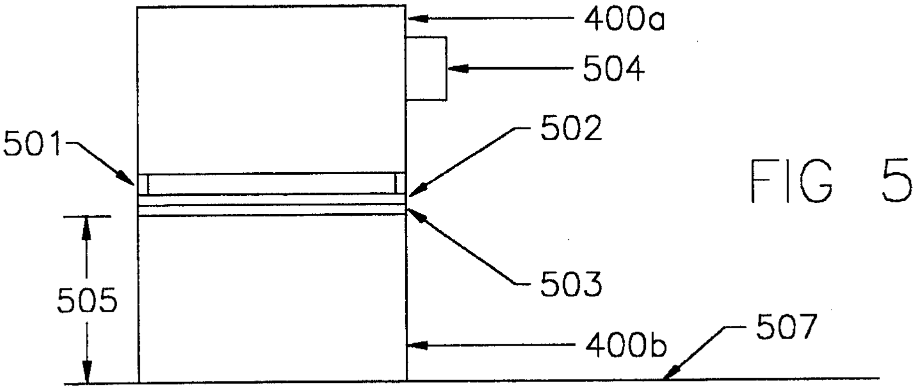
FIG. 5 is a side view of a system for manufacturing fiber optic signs in accordance with the present invention.

FIG. 5 depicts an exemplary arrangement for practice of the present invention. The arrangement of FIG. 5 includes a screen 503 and stencil 502 which may be bonded together to form the desired design. A frame 501 surrounds the entire design. The frame 501 may be made of wood, plastic, etc., and is slightly deeper than the desired thickness of the face of the sign.

Lower hexcell 400*b* is placed beneath the screen 503. The depth 505 of lower hexcell 400 is preferably set so that the fibers 506, when fully inserted as shown in FIG. 6, are just long enough to emanate out of stencil 502 to the height of frame 501 as shown.

To practice the inventive method, lower hexcell 400*b* is placed on a flat surface 507. The screen 503 and stencil 502 are placed on top of lower hexcell 400*b*. Frame 501 may be attached to the border of stencil 502.

A second upper piece of hexcell 400*a*, termed a fiber holder, is then placed on the frame 501 as shown, and connected to a vibrator 504. Vibrator 504 causes very slight oscillatory movement of upper hexcell 400*a* with respect to the design on stencil 502. It should be noted that upper hexcell 400*a* and lower hexcell 400*b* may be replaced with any suitable holder for keeping the fibers to be inserted held substantially parallel to each other and perpendicular to the stencil 502.

Figure 6:
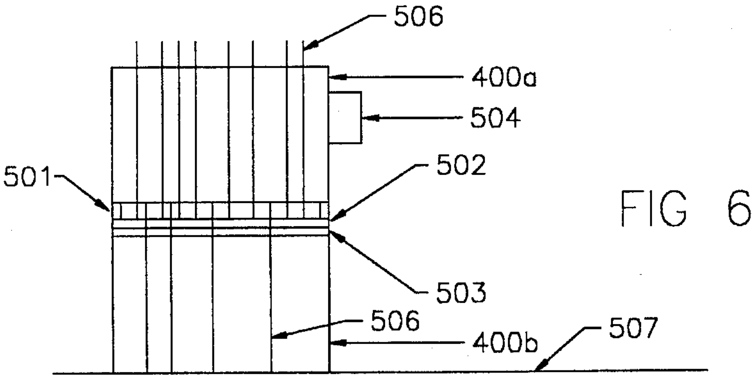
FIG. 6 shows another side view of the system of FIG. 5, the view of FIG. 6 showing the system in a different stage of the manufacturing process than that of FIG. 5.

After all parts are stacked as shown in FIG. 5, upper hexcell 400*a* is filled with cut length fibers 506 as shown in FIG. 6. When the fibers are dropped into upper hexcell 400*a*, a small amount will fall through the holes forming the desired design and into the lower hexcell 400*b*. Most of the fibers 506 will remain in the upper hexcell 400*a*, as shown in FIG. 6, for two reasons. First, many of the fibers 506, when dropped into upper hexcell 400*a*, will fall up against portions of stencil 502 which have not been cut away to form the design. Second, many of the fibers 506 which fall within the area of the design will rest against the portions of screen 503 which are between the holes in the screen.

Figure 7:
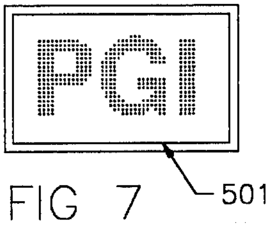
FIG. 7 is a top view of the arrangement of FIG. 5, during a later stage of the process.
Figure 8:
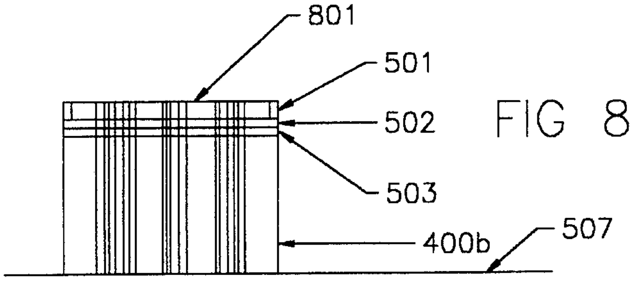
FIG. 8 shows a side view of a portion of the system shown in FIG. 7.

In order to insert the fibers 506 into the holes which form the design and into the lower hexcell 400*b*, vibrator 504 is activated, causing a slight oscillatory motion of top hexcell 400*a* with respect to stencil 502. This slight vibration of fibers will cause them to fall through the holes in screen 503, filling in the area of the desired design. All fibers remaining in the upper hexcell 400*a* are removed with the upper hexcell, leaving the design remaining in fiber in the lower hexcell. The pattern of fibers defines the design and is shown in FIG. 7 from a top view and in FIG. 8 from the side. The process is remarkably fast, completely filling all the holes with fibers in less than 60 seconds.

It can be appreciated that the frame 501 leaves a cavity 801, inside of which is the design. This cavity is then filled with a castable compound such as epoxy or an acrylic. The castable compound is filled to the desired thickness of the face plate of the sign, which is slightly lower than the thickness of frame 501. It has been found that ¼" works well, but other thicknesses are certainly possible. Since the castable compound will stick to the stencil 502, frame 501, and screen 503 being used, it is necessary to coat cavity 801 with a mold release substance before inserting the fibers. Many mold release substances are well known. For purposes of explanation, a mold release substance is one which allows the hardened castable compound to be removed from the cavity without sticking, breaking or tearing. Such a coating will allow the hardened castable compound to be readily removed. After hardening, the castable compound forms a block with fibers 506 embedded therein in the shape of the desired design.

Figure 9:
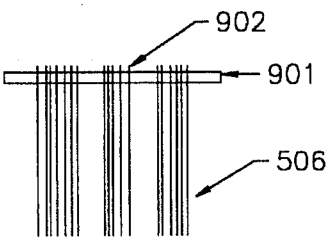
FIG. 9 is a side view of the hardened castable compound with the fiber optic design embedded just after it is removed from cavity 801.

The hardened block of castable compound is then pulled upward out of cavity 801, causing the fibers to be pulled back through the holes 101 and removed therewith. The resultant fiber optic sign is shown in FIG. 9. The hardened block of castable compound 901 holds the fibers to form the design.

It is noted that the combination of the stencil and the screen form a fixture that can be reused countless thousands of times since the finished sign is completely removed therefrom. Thus, unlike the prior art, there is no need to separately drill holes for each identical sign to be manufactured. This is another factor making the present sign much cheaper to produce.

As depicted in FIG. 9, the block 901 is then finished by cutting the fibers which slightly stick out of the top thereof. Finally, top surface 902 may then be polished and/or coated to obtain a professional looking product. The ends of fibers 506 not embedded in the block are bunched and connected to a suitable light source for illumination. The light source may optionally include a color wheel, for providing different colors and intensities of light as in the prior art.

While the above describes the preferred embodiment of the invention, other variations and or modifications are possible without violating the spirit and scope thereof. For example, rather than vibrating the hexcell to insert the fibers, the stencil and screen may be vibrated. The lower and upper portions of hexcell may be replaced with any type of holders. Other variations are also possible, and all such variations are intended to be covered by the following claims.

We claim:

1. A method of making a fiber optic sign comprising the steps of:

(i) arranging a plurality of fibers to form a desired design from ends of the fibers, said step of arranging comprising the sub steps of:

placing a lower fiber holder on a level surface;

forming a desired design having a plurality of holes in a template;

placing said template including the desired design on top of said lower fiber holder, placing an upper fiber holder over said template, filling said upper fiber holder with fibers so that a portion of the fibers rest against the desired design formed on the template, and the remainder of the fibers rest against the portion of the template not containing the design, and causing the portion of the fibers which rest against the desired design to fall through said holes ii said method further comprising the steps of embedding a portion of each of the plurality of fibers in a castable substance; and iii allowing the castable substance to harden such that the hardened castable substance maintains the ends of the fibers in the shape of the design to form the optic sign.

2. The method of claim 1 wherein said step of causing includes the step of vibrating the upper fiber holder.

3. The method of claim 3 wherein said fiber holders are hexcell.

4. The method of claim 1 wherein said step of forming includes the step of affixing a cutout of the desired design to a screen.

5. The method of claim 1 wherein said step of forming includes the step of forming a plurality of holes in a plate.

6. The method of claim 1 further comprising the step of placing a varying light source at an end of the fibers to cause illumination of said sign.

7. The method of claim 1 wherein said step of embedding includes the steps of:

forming a cavity around the portions of the fibers to be coated; and filling said cavity with a castable substance.

8. The method of claim 7 wherein said cavity is coated with a non-stick substance prior to insertion of said fibers.

9. The method of claim 1 further comprising the steps of:

cutting away excess lengths of fibers emanating from the hardened castable compound; and polishing at least one face of the hardened castable compound.

* * * * *